United States Patent [19]

Ohta

[11] Patent Number: 4,613,911
[45] Date of Patent: Sep. 23, 1986

[54] PHOTOGRAPHIC FILM WITH MAGNETIC RECORDING TRACK AND METHOD OF RECORDING ON THE TRACK AND REPRODUCTION FROM THE SAME

[75] Inventor: Takahiro Ohta, Kaisei, Japan

[73] Assignee: Fuji Photo Film Co., Ltd., Tokyo, Japan

[21] Appl. No.: 677,835

[22] Filed: Dec. 4, 1984

[30] Foreign Application Priority Data

Dec. 6, 1983 [JP] Japan .................... 58-230329

[51] Int. Cl.4 .............................. G03B 31/00
[52] U.S. Cl. ......................... 360/3; 352/27; 352/37; 428/900; 430/934
[58] Field of Search .......... 428/692, 119, 694, 192, 428/900; 430/140, 934; 360/3; 352/37, 233, 236, 92, 27

[56] References Cited

U.S. PATENT DOCUMENTS

| 1,965,173 | 7/1934 | Canton | 360/3 |
| 2,176,303 | 10/1939 | Jones | 430/140 |
| 2,203,352 | 6/1940 | Goldmark | 430/140 |
| 2,536,029 | 1/1951 | Camras | 360/3 |
| 2,564,312 | 8/1951 | Rossmann et al. | 430/140 |
| 2,869,878 | 1/1959 | Camras | 352/37 |
| 2,950,971 | 8/1960 | Lewis | 430/140 |
| 3,041,196 | 6/1962 | Stella | 428/900 |
| 3,220,843 | 11/1965 | Lovick et al. | 430/140 |
| 3,782,947 | 1/1974 | Krall | 430/60 |
| 3,840,374 | 10/1974 | Van Paesschen et al. | 430/140 |
| 3,846,591 | 11/1974 | Case | 430/140 |
| 3,852,069 | 12/1974 | Van Paesschen et al. | 430/140 |
| 3,891,444 | 6/1975 | Van Paesschen et al. | 430/140 |
| 4,054,920 | 10/1977 | Kittag | 360/3 |
| 4,341,855 | 7/1982 | Morrison et al. | 422/128 |

FOREIGN PATENT DOCUMENTS 53-109604  9/1978  Japan.
57-6576  2/1982  Japan.

Primary Examiner—George F. Lesmes
Assistant Examiner—William M. Atkinson
Attorney, Agent, or Firm—Pasquale A. Razzano

[57] ABSTRACT

Photographic film is provided with a magnetic recording layer applied to at least one edge surface thereof in the longitudinal direction of the film and substantially over the entire thickness thereof. A magnetic head of a recording-reproducing system is positioned upon recording or reproduction so that a magnetic field is established in the direction of thickness of the film or the direction of width of the magnetic recording layer.

1 Claim, 4 Drawing Figures

PHOTOGRAPHIC FILM WITH MAGNETIC RECORDING TRACK AND METHOD OF RECORDING ON THE TRACK AND REPRODUCTION FROM THE SAME

BACKGROUND OF THE INVENTION

1. Field of the Invention

This invention relates to a photographic film with magnetic recording track and method of recording on the track and reproduction from the same.

2. Description of the Prior Art

One well-known photographic film with magnetic recording track is cinefilm having a sound track. Recently, there has been proposed photographic film for still pictures provided with a magnetic recording layer. For example, in Japanese Unexamined Patent Publication No. 53(1978)-109604 and Japanese Patent Publication No. 57(1982)-6576 is disclosed photographic film having a transparent magnetic recording layer applied thereto over the entire surface thereof.

Photographic film with magnetic recording track is advantageous in that, in addition to image information, various data on the image information such as the photographing day, exposure conditions, photographing place, photographer, other data on photographing, and data for photographic laboratory use, e.g., correction data which can be used to obtain an optimum print depending on the finish following development, can be recorded on the film, thereby greatly adding to the usefulness of the photographic film.

Further, the magnetic recording track can be used as a recording section for providing a photographic camera with such information for controlling the camera as the sensitivity of the film or the number of exposed or unexposed frames, thereby making the photographic film more convenient in use.

SUMMARY OF THE INVENTION

The primary object of the present invention is to provide novel photographic film with magnetic recording track.

Another object of the present invention is to provide a method of magnetic recording on the novel photographic film and reproduction from the same.

Still another object of the present invention is to provide a method of magnetic recording on photographic film with magnetic recording track and reproduction from the same in which there is no possibility of the surface of the film being scratched or the material of the film or the magnetic recording layer being peeled off through contact of the magnetic head of the recording/reproducing system and the film.

The photographic film in accordance with the present invention is characterized by having a magnetic recording layer applied to at least one edge surface thereof in the longitudinal direction of the film and substantially over the entire thickness thereof.

As the photographic film, substantially any photographic film, e.g., cinefilm or 135 film, can be used. The photographic film with magnetic recording track in accordance with the present invention is advantageous over the conventional photographic film with magnetic recording track in various aspects. For example, in cinefilm in accordance with the present invention in which the magnetic recording layer is applied to both edge surfaces of the film, the edge surfaces are both protected and smoothed by the magnetic recording layer and therefore the emulsion layer on the film is prevented from being peeled off at the edge portions of the film unlike in conventional cinefilm.

In either cinefilm or still film in accordance with the present invention, since there is no magnetic recording layer on the image area of the film, an image recorded on the film cannot be affected by the magnetic recording layer, and the area of the film can be effectively used for recording of a visible image. Further, since the magnetic recording layer need not be transparent, the types of material usable for the magnetic recording layer can be greatly expanded.

Since the magnetic recording layer of the photographic film of the present invention has its width in the direction of thickness of the film, so-called transverse or Y-direction magnetic recording (a recording system in which a recording magnetic field is established in the direction of thickness of the film) is preferable over ordinary Z-direction recording for recording on and reproduction from the recording track of the film of the present invention. Y-direction magnetic recording is particularly suitable for the film of the present invention, since it makes high density recording and reproduction in the non-contact fashion is feasible. If the magnetic head is in contact with the film during recording or reproduction, there is the possibility of the film being scratched so as to ruin the image recorded thereon and/or peel off the material of the film or the magnetic recording layer through contact of the film and the magnetic head. Therefore, the non-contact recording and reproduction using Y-direction recording is very advantageous in practical use.

DESCRIPTION OF THE PREFERRED EMBODIMENT

Figure 1:
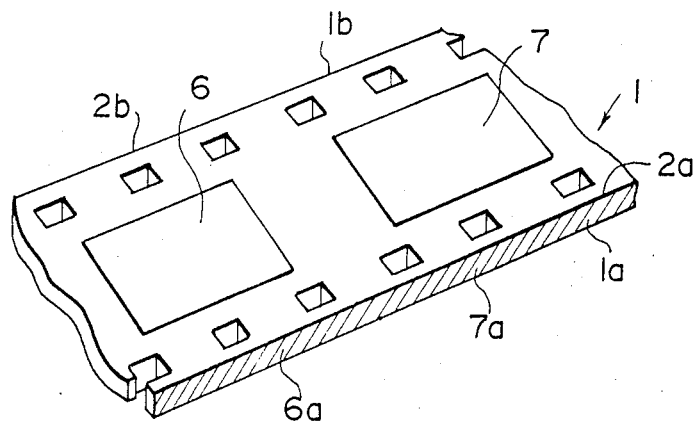
FIG. 1 is an enlarged fragmentary perspective view of a photographic film with magnetic recording track in accordance with an embodiment of the present invention.

FIG. 1 shows photographic film with magnetic recording track in accordance with an embodiment of the present invention. The photographic film with magnetic recording track 1 of this embodiment is provided with a pair of magnetic recording layers 2a and 2b uniformly coated on opposite edge surfaces 1a and 1b thereof by use of, for instance, a roll coater. The thickness of the film with magnetic recording track 1 including the emulsion layer is about 120 μm, and the magnetic recording layers 2a and 2b are about several μm to ten-odd μm thick.

Figure 2:
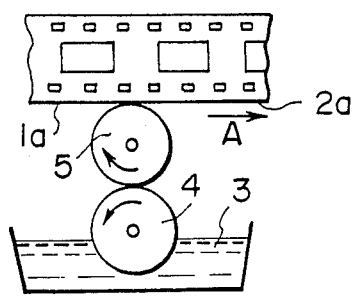
FIG. 2 is a schematic view showing a manner of coating magnetic material on an edge surface of the film using a roll coater.

FIG. 2 shows a manner of coating magnetic material 3 on the edge surface 1a of the film 1 to form the magnetic recording layer 2a by use of a roll coater. The magnetic material 3 rolls easily and is uniformly coated on the surface of a roll 5 by a roll 4. The magnetic material 3 is then uniformly coated by the roll 5 on the side surface 1a of the film 1 transferred in the direction of the arrow A.

The magnetic recording track may be formed by vapor deposition of magnetic material onto the edge surfaces of the film. This can be done, for instance, by rolling the film and vapor-depositing the magnetic material onto the end faces of the film roll.

In use, data on photographed images 6 and 7 can be recorded on recording portions 6a and 7a of the magnetic recording layers 2a and 2b respectively corresponding to the frames of the images 6 and 7.

Figure 3:
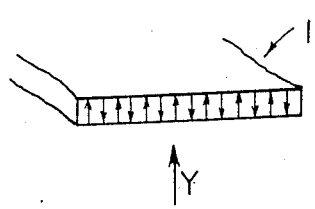
FIG. 3 is a schematic view for illustrating "Y-direction recording"

As described above, recording on the magnetic recording track (magnetic recording layers 2a and 2b) of the film of the present invention is preferably accomplished in the Y-direction, i.e., the direction of width of the recording track as shown in FIG. 3.

Figure 4:
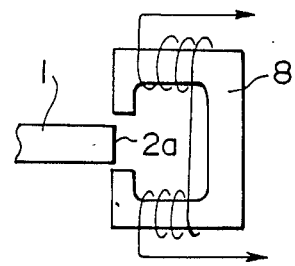
FIG. 4 is a schematic view showing the relation between the film and the magnetic head for accomplishing the Y-direction recording.

FIG. 4 shows the relation between the film 1 and a magnetic head 8 of a recording system or a reproducing system for accomplishing the Y-direction recording or reproduction. That is, in the Y-direction recording or reproduction, the magnetic head 8 is spaced from the film 1 and positioned so that the magnetic poles are established opposed to each other in the direction of width of the magnetic recording layer 2a or 2b, i.e., in the vertical direction as seen in FIG. 4 with the film 1 being transferred in the direction perpendicular to the plane of the paper of the drawings.

I claim:

1. A method of magnetic recording on photographic film having a magnetic recording layer coated on an edge surface of the film in the longitudinal direction thereof and magnetic reproduction from the same characterized in that a magnetic head is positioned with respect to said edge surface of the film so as to establish a magnetic field in the direction of thickness of the film upon recording and so as to read a magnetic field in the direction of thickness of the film upon reproduction, with the magnetic head being kept spaced from the film, thereby accomplishing Y-direction recording or reproduction.

* * * * *